United States Patent
Lo et al.

(10) Patent No.: US 7,737,775 B2
(45) Date of Patent: Jun. 15, 2010

(54) LOW-NOISE DC OFFSET CALIBRATION CIRCUIT AND RELATED RECEIVER STAGE

(75) Inventors: Chi-Lun Lo, Taoyuan County (TW); Yu-Hsin Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 10 days.

(21) Appl. No.: 12/168,159

(22) Filed: Jul. 7, 2008

(65) Prior Publication Data
US 2010/0001792 A1  Jan. 7, 2010

(51) Int. Cl.
*H03F 1/02* (2006.01)
(52) U.S. Cl. .............................. 330/9; 330/86
(58) Field of Classification Search ............ 330/9, 330/86, 282
See application file for complete search history.

(56) References Cited

U.S. PATENT DOCUMENTS

| | | | |
|---|---|---|---|
| 6,545,534 B1 * | 4/2003 | Mehr | 330/69 |
| 7,012,458 B1 * | 3/2006 | Roo | 330/9 |
| 7,352,238 B2 * | 4/2008 | Elwan et al. | 330/86 |

* cited by examiner

*Primary Examiner*—Khanh V Nguyen
(74) *Attorney, Agent, or Firm*—Winston Hsu

(57) ABSTRACT

A receiver stage has an operational amplifier, a feedback resistor coupled between an output of the operational amplifier and an input of the operational amplifier, and a DC offset calibration circuit. The DC offset calibration circuit includes a plurality of resistors and a plurality of switches. Each resistor has a first end coupled to a supply voltage. First ends of each of the switches are coupled to second ends of each of the resistors, respectively, and second ends of the switches are coupled to the input of the operational amplifier.

9 Claims, 5 Drawing Sheets

LOW-NOISE DC OFFSET CALIBRATION CIRCUIT AND RELATED RECEIVER STAGE

BACKGROUND OF THE INVENTION

The present invention relates to DC offset calibration circuits, and more particularly, to a low-noise DC offset calibration circuit and related receiver stage.

In wireless receiver design, because overall gain of the wireless receiver is very high, even slight process variations can cause a large DC offset at an output of the wireless receiver. Dynamic range of the output, which is passed to a baseband circuit, is thereby reduced.

A wireless receiver 10, shown in FIG. 1, includes a low noise amplifier (LNA) 100, a mixer 110, a channel-select filter 120, and a programmable gain amplifier (PGA) 130. To reduce DC offset of the wireless receiver 10, a DC offset calibration circuit 140 may be used to perform DC offset compensation. The DC offset calibration circuit 140 includes a number of switched current sources 141, which may be coupled to an input end of an operational amplifier 131 of the PGA 130, as shown in FIG. 2. A DC offset compensation voltage is then generated across feedback resistors Rfb. DC offset calibration resolution is determined by sizes of the switched current sources. In order to provide better resolution, transistors utilized for realizing the switched current sources are relatively small, which leads to a large contribution of flicker noise.

SUMMARY OF THE INVENTION

According to a first embodiment, a DC offset calibration circuit comprises first and second resistors and first and second switches. The first resistor has a first end coupled to a first supply voltage, and the second resistor has a first end coupled to a second supply voltage. The first switch has a first end coupled to a second end of the first resistor, and a second end coupled to a first input of an amplifier. The second switch has a first end coupled to a second end of the second resistor, and a second end coupled to a second input of the amplifier.

According to the first embodiment, a receiver stage may comprise an operational amplifier, a first feedback resistor coupled between a first output of the operational amplifier and a first input of the operational amplifier, a second feedback resistor coupled between a second output of the operational amplifier and a second input of the operational amplifier, and a DC offset calibration circuit as mentioned above.

According to a second embodiment, a DC offset calibration circuit may comprise two R-2R resistor arrays, a plurality of first switches, and a plurality of second switches. A first end of one of the R-2R resistor arrays is coupled to a first supply voltage, and a first end of the other R-2R resistor array is coupled to a second supply voltage. Each R-2R resistor array comprises a plurality of first resistors in series, a plurality of second resistors, and a third resistor. A first end of the plurality of first resistors forms the first end of the R-2R array, each of the first resistors has a first resistance, and each consecutive pair of the first resistors forms a node. A first end of one of the second resistors is coupled to a second end of the plurality of first resistors. First ends of the second resistors other than the one are coupled to each of the nodes, respectively. Each of the second resistors has a second resistance substantially twice the first resistance. The third resistor has the second resistance, and has a first end coupled to the second end of the plurality of first resistors. First ends of each of the first switches are coupled to second ends of the second resistors, respectively, and second ends of each of the first switches are coupled to a first input of an amplifier. First ends of each of the second switches are coupled to the second ends of the second resistors, respectively, and second ends of each of the first switches are coupled to a second input of the amplifier. The third resistor of the one R-2R resistor array has a second end coupled to the first input of the amplifier, and the third resistor of the other R-2R resistor array has a second end coupled to the second input of the amplifier.

According to the second embodiment, a receiver stage may comprise an operational amplifier, a first feedback resistor coupled between a first output of the operational amplifier and a first input of the operational amplifier, a second feedback resistor coupled between a second output of the operational amplifier and a second input of the operational amplifier, and a DC offset calibration circuit as mentioned above.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
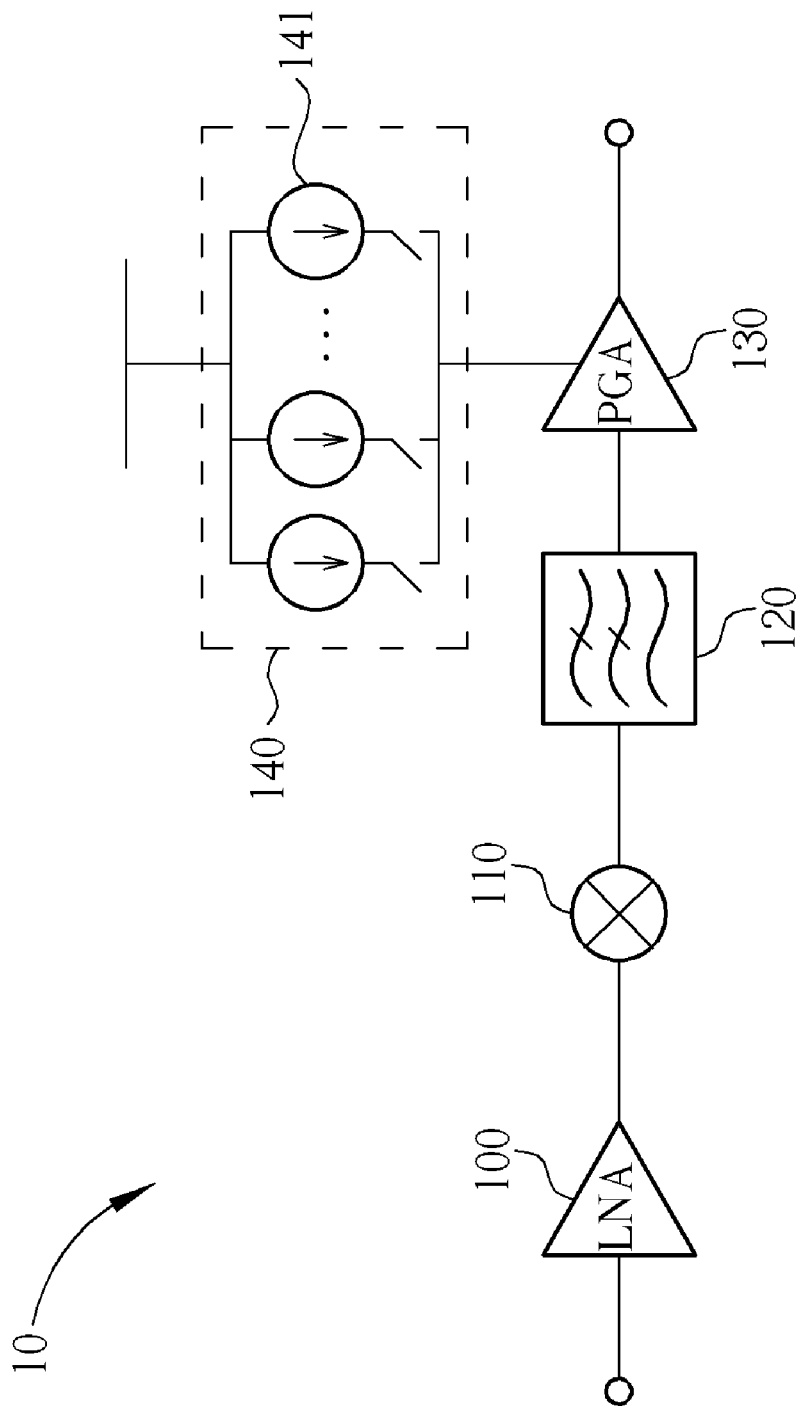
FIG. 1 is a diagram of a wireless receiver with a DC offset calibration circuit according to the prior art.
Figure 2:
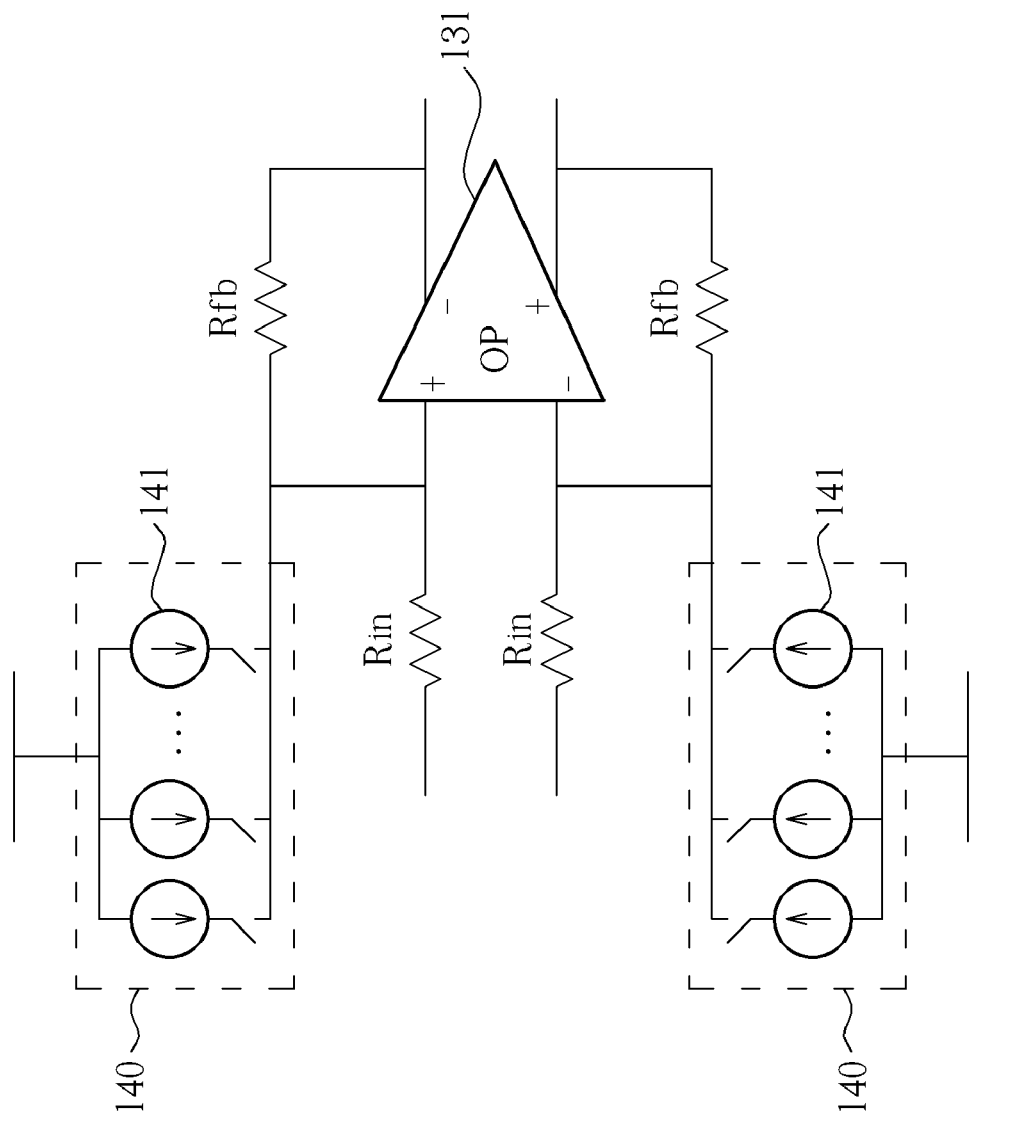
FIG. 2 is a diagram of an operational amplifier of a programmable gain amplifier of the wireless receiver of FIG. 1 with the DC offset calibration circuit according to the prior art.
Figure 3:
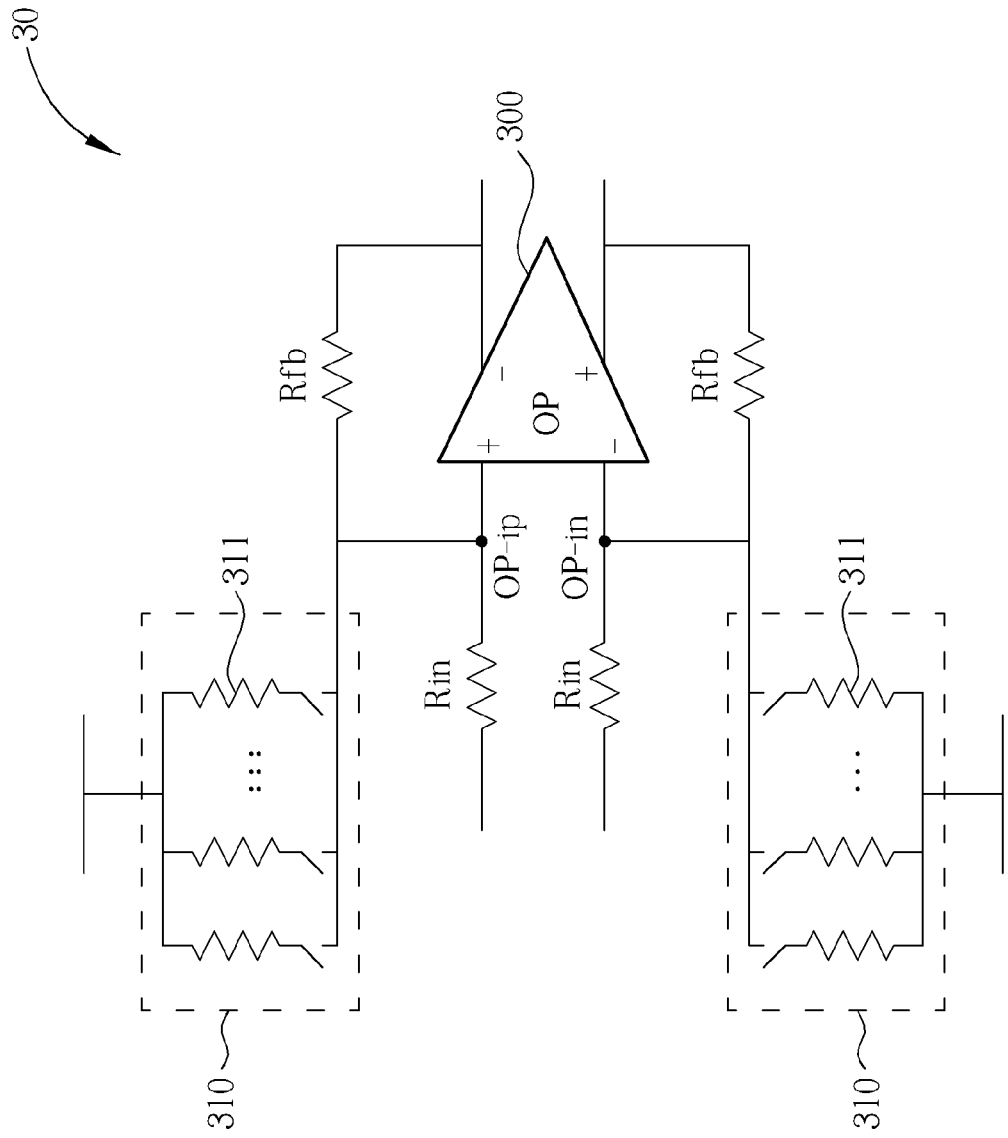
FIG. 3 is a diagram of an operational amplifier calibrated by a low noise DC offset calibration circuit according to an embodiment of the present invention.
Figure 5:
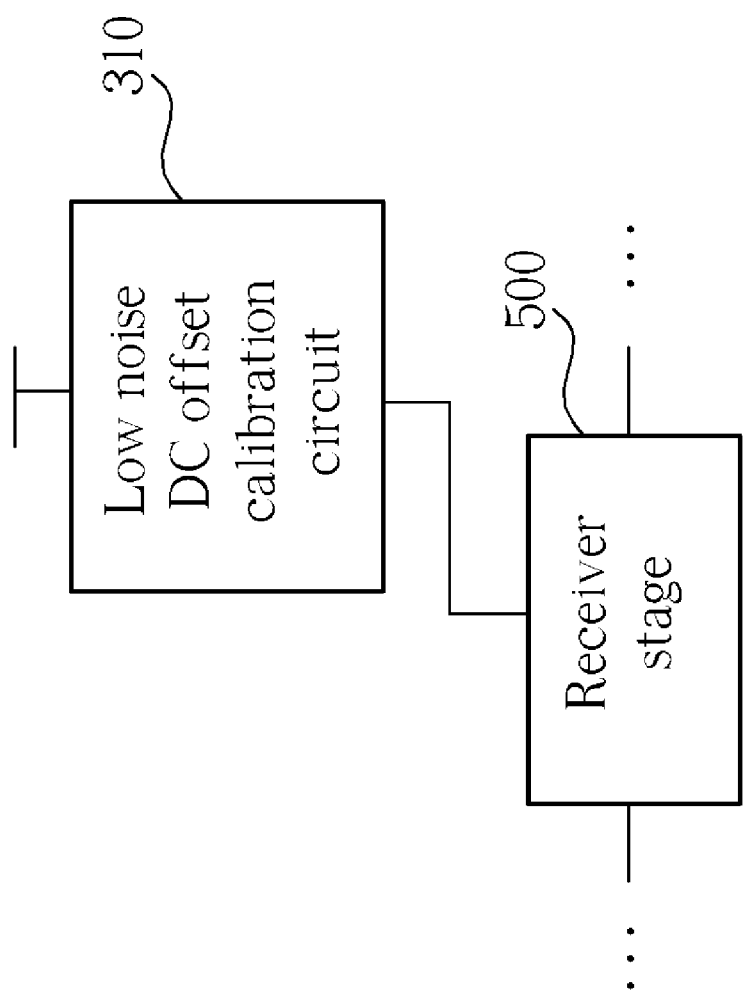
FIG. 5 is a diagram of a receiver stage calibrated by a low noise DC offset calibration circuit according to an embodiment of the present invention.

Please refer to FIG. 3, which is a diagram of an operational amplifier 300 of a receiver stage 30, such as the programmable gain amplifier described above, calibrated by a low noise DC offset calibration circuit 310 according to a first embodiment of the present invention. The low noise DC offset calibration circuit 310 comprises a plurality of switched resistor units 311 coupled to input ends op_ip, op_in of the operational amplifier 300 and to respective supply voltages. Each switched resistor unit 311 comprises a resistor in series with a switch. First ends of each of the resistors of the low noise DC offset calibration circuit 310 are coupled to either a first supply voltage or a second supply voltage. First ends of each of the switches are coupled to second ends of each of the resistors, respectively, and second ends of the switches are coupled to the first or second input ends of the operation amplifier 300. The resistors may be polysilicon resistors, transistors operated in the triode region, or a combination thereof, and the switches may be transistors. Due to the use of resistors instead of transistor current sources to provide the compensation current to the feedback resistors Rfb, the low noise DC offset calibration circuit 310 eliminates flicker noise and its effect on performance. The compensation current is decided then according to how the plurality of switched resistor units 311 are switched in. The plurality of resistors of the switched resistor units 311 may be designed with a binary proportion, e.g. 16:8:4:2:1, which may then be multiplied by a resistance coefficient, such as 1 kOhm, so as to form 16 k, 8 k, 4 k, 2k and 1 kOhm resistors. In this way, a binary control signal may be applied to the plurality of switches to select a range of DC offset compensation currents to form a binary compensation current. For example, a signal of 1-0-1-0-0 may generate a resistance of 3.2 times the resistance constant, i.e. 3.2 kOhm, whereas a signal of 1-1-0-0-0 may generate a resistance of 5.333 times the resistance constant, i.e. 5.333 kOhm. A lower resistance results in a higher compensation current, and a higher resistance results in a lower compensation current. As a signal of 1-0-0-0-0 is input, the compensation current may then be 1/16000 the supply voltage. Of course, to attain better resolution, greater numbers of switched resistor units 311 may be utilized, whereas fewer numbers may be utilized to reduce resolution. The low noise DC offset calibration circuit 310 may be applied to the programmable gain amplifier, or, as shown in FIG. 5, to another receiver stage 500, such as a low noise amplifier (LNA), mixer, or channel-select filter.

Figure 4:
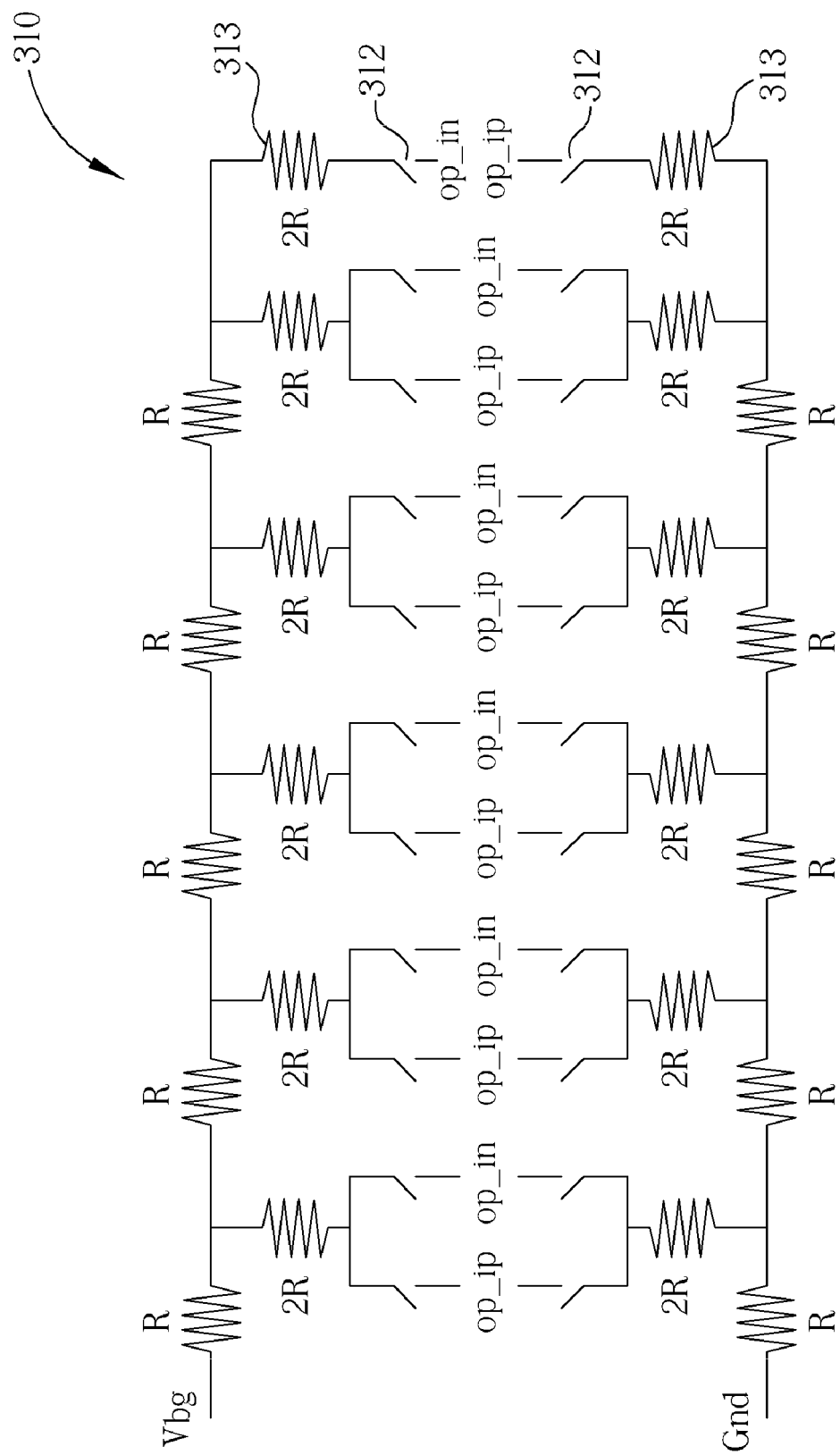
FIG. 4 is a diagram of a low noise DC offset calibration circuit according to a second embodiment of the present invention.

When taking into account power supply rejection ratio (PSRR) and size of resistor array utilized for the low noise DC offset calibration circuit 310, an architecture such as that shown in FIG. 4 becomes advantageous. FIG. 4 is a diagram of the low noise DC offset calibration circuit 310 according to a second embodiment of the present invention. The low noise DC offset calibration circuit 310 shown in FIG. 4 comprises two R-2R resistor arrays that are coupled at respective first ends to a first supply voltage and a second supply voltage, respectively. In this embodiment, the first supply voltage may be a band-gap voltage, and the second supply voltage may be ground. The R-2R resistor arrays may be switched in to the first and second inputs op_ip, op_in of the operational amplifier 300 by a plurality of first switches and a plurality of second switches, respectively. As shown, each of the R-2R resistor arrays can be seen as a plurality of first resistors of first resistance R, a plurality of second resistors of second resistance 2R substantially twice the first resistance R, and a third resistor 313 of the second resistance 2R. The first resistors are in series, with a first end forming the first end of the R-2R resistor array, and a second end coupled to one of the second resistors. Consecutive first resistors form nodes, and the second resistors other than the one mentioned above are coupled to the nodes respectively. Each of the second resistors is coupled to one of the first switches and one of the second switches. The first and second switches may be turned on or off to couple or decouple the second resistors to or from the first input and the second input of the amplifier, respectively. The third resistor 313 of the one R-2R resistor array is coupled to the first input, and the third resistor 313 of the other R-2R resistor array is coupled to the second input of the amplifier. The third resistors 313 may be coupled to the respective first or second inputs of the amplifier through third switches. The third switches may be nominally ON (closed). However, the third switches may be replaced with short circuits.

In the example shown in FIG. 4, the resistor arrays are 5-bit controlled resistor arrays, whose current resolutions may be calculated as follows:

$$in_p = \frac{(v_{bg} - v_{cm})}{2R} * (b_4 * 2^{-1} + b_3 * 2^{-2} + b_2 * 2^{-3} + b_1 * 2^{-4} + b_0 * 2^{-5}) +$$
$$\frac{(0 - v_{cm})}{2R}(\overline{b_4} * 2^{-1} + \overline{b_3} * 2^{-2} + \overline{b_2} * 2^{-3} + \overline{b_1} * 2^{-4} + \overline{b_0} * 2^{-5}) +$$
$$\frac{(0 - v_{cm})}{2R} * 2^{-5}$$

$$in_n = \frac{(0 - v_{cm})}{2R} * (b_4 * 2^{-1} + b_3 * 2^{-2} + b_2 * 2^{-3} + b_1 * 2^{-4} + b_0 * 2^{-5}) +$$
$$\frac{(v_{bg} - v_{cm})}{2R} * (\overline{b_4} * 2^{-1} + \overline{b_3} * 2^{-2} + \overline{b_2} * 2^{-3} + \overline{b_1} * 2^{-4} + \overline{b_0} * 2^{-5}) +$$
$$\frac{(v_{bg} - v_{cm})}{2R} * 2^{-5}$$

$$in_p - in_n = \frac{v_{bg}}{2R} * (b_4 * 2^{-1} + b_3 * 2^{-2} + b_2 * 2^{-3} + b_1 * 2^{-4} + b_0 * 2^{-5}) -$$
$$\frac{v_{bg}}{2R} * (\overline{b_4} * 2^{-1} + \overline{b_3} * 2^{-2} + \overline{b_2} * 2^{-3} + \overline{b_1} * 2^{-4} + \overline{b_0} * 2^{-5}) - \frac{v_{bg}}{2R} * 2^{-5}$$

when $vdac = 0 \Rightarrow in_p - in_n =$
$$-\frac{v_{bg}}{2R} * (2^{-1} + 2^{-2} + 2^{-3} + 2^{-4} + 2^{-5}) - \frac{v_{bg}}{2R} * 2^{-5}$$

when $vdac = 1 \Rightarrow in_p - in_n =$
$$\frac{v_{bg}}{2R} * 2^{-5} - \frac{v_{bg}}{2R} * (2^{-1} + 2^{-2} + 2^{-3} + 2^{-4}) - \frac{v_{bg}}{2R} * 2^{-5}$$

$$1 LSB = \frac{v_{bg}}{2R} * 2^{-4},$$

$$VLSB = \frac{v_{bg}}{2R} * 2^{-4} * Rfb$$

where $in_p$ and $in_n$ are input currents provided by the low noise DC offset calibration circuit 310, Vbg is a supply voltage, Vcm is a common mode voltage, b0-b4 are control bits for the resistor array, Vdac is a control signal applied to the switches, and 1 LSB is a least significant bit, or the current resolution. Of course, the least significant bit 1 LSB may be made even finer by adding more R-2R branches to the low noise DC offset calibration circuit 310. Or, the least significant bit 1 LSB may be made coarser by removing R-2R branches from the low noise DC offset calibration circuit 310.

The above low noise DC offset calibration circuits and related receiver stages, which may be fabricated by CMOS process or any other suitable processes, employ switched resistors or switched R-2R resistor arrays to provide DC offset compensation current, while maintaining improved noise performance due to reduction of flicker noise.

Those skilled in the art will readily observe that numerous modifications and alterations of the device and method may be made while retaining the teachings of the invention.

What is claimed is:

1. A DC offset calibration circuit comprising:
two R-2R resistor arrays, a first end of one R-2R resistor array coupled to a first supply voltage, a first end of the other R-2R resistor array coupled to a second supply voltage, each R-2R resistor array comprising:
a plurality of first resistors in series, a first end of the plurality of first resistors forming the first end of the R-2R array, each of the first resistors having a first resistance, each consecutive pair of the first resistors forming a node;

a plurality of second resistors, a first end of one of the second resistors coupled to a second end of the plurality of first resistors, first ends of the second resistors other than the one coupled to each of the nodes respectively, each of the second resistors having a second resistance substantially twice the first resistance; and a third resistor having the second resistance, a first end of the third resistor coupled to the second end of the plurality of first resistors;

a plurality of first switches, first ends of each of the first switches coupled to second ends of the second resistors respectively, second ends of each of the first switches coupled to a first input of an amplifier; and a plurality of second switches, first ends of each of the second switches coupled to the second ends of the second resistors respectively, second ends of each of the second switches coupled to a second input of the amplifier;

wherein the third resistor of the one R-2R resistor array has a second end coupled to the first input of the amplifier, and the third resistor of the other R-2R resistor array has a second end coupled to the second input of the amplifier.

2. The DC offset calibration circuit of claim 1, further comprising a third switch having a first end coupled to the second end of the third resistor of the one R-2R resistor array, and a second end coupled to the first input of the amplifier.

3. The DC offset calibration circuit of claim 1, further comprising a third switch having a first end coupled to the second end of the third resistor of the other R-2R resistor array, and a second end coupled to the second input of the amplifier.

4. The DC offset calibration circuit of claim 1, wherein the plurality of first resistors and the plurality of second resistors are polysilicon resistors, transistors operated in the triode region, or a combination thereof, and the plurality of switches are transistors.

5. A receiver stage comprising:
an operational amplifier;
a first feedback resistor coupled between a first output of the operational amplifier and a first input of the operational amplifier;
a second feedback resistor coupled between a second output of the operational amplifier and a second input of the operational amplifier; and
a DC offset calibration circuit comprising:
two R-2R resistor arrays, a first end of one R-2R resistor array coupled to a first supply voltage, a first end of the other R-2R resistor array coupled to a second supply voltage, each R-2R resistor array comprising:
a plurality of first resistors in series, a first end of the plurality of first resistors forming the first end of the R-2R array, each of the first resistors having a first resistance, each consecutive pair of the first resistors forming a node; and
a plurality of second resistors, first ends of two of the second resistors coupled to a second end of the plurality of first resistors, first ends of the second resistors other than the two coupled to each of the nodes respectively, each of the second resistors having a second resistance substantially twice the first resistance; and
a plurality of switches, first ends of each of the switches coupled to second ends of the second resistors respectively, second ends of each of the switches coupled to an input of an amplifier.

6. The receiver stage of claim 5, wherein the plurality of first resistors and the plurality of second resistors are polysilicon resistors, transistors operated in the triode region, or a combination thereof, and the plurality of switches are transistors.

7. The receiver stage of claim 5, wherein the receiver stage is a programmable gain amplifier.

8. The receiver stage of claim 5, wherein the receiver stage is a mixer.

9. The receiver stage of claim 5, wherein the receiver stage is a low pass filter.

* * * * *